United States Patent [19]

Hruden

[11] Patent Number: 4,725,514

[45] Date of Patent: * Feb. 16, 1988

[54] DEFERRED ACTION BATTERY ACTIVATED BY ROTATION

[76] Inventor: Wayne R. Hruden, P.O. Box 1674, San Luis Obispo, Calif. 93406

[*] Notice: The portion of the term of this patent subsequent to Dec. 9, 2003 has been disclaimed.

[21] Appl. No.: 759,822

[22] Filed: Jul. 26, 1985

Related U.S. Application Data

[63] Continuation of Ser. No. 601,865, Apr. 19, 1984.

[51] Int. Cl.$^4$ .......................... H01M 6/36; H01M 6/38
[52] U.S. Cl. .................................... 429/114; 429/113; 429/117
[58] Field of Search ................. 429/117, 114, 113, 110

[56] References Cited

U.S. PATENT DOCUMENTS

| | | | |
|---|---|---|---|
| Re. 15,846 | 5/1915 | French | 429/113 |
| 1,417,692 | 5/1922 | Rosen | 429/116 |
| 1,503,380 | 7/1924 | Rosen et al. | 219/145.410 |
| 1,518,301 | 12/1924 | Benner et al. | 429/116 |
| 2,832,814 | 4/1956 | Shannon | 429/116 |
| 2,852,592 | 9/1958 | Salauze | 422/243 |
| 3,228,801 | 1/1966 | Snyder | 429/113 |
| 3,394,033 | 7/1968 | Hickerson | 429/117 |
| 3,718,508 | 2/1973 | Levine | 429/114 |
| 4,031,296 | 6/1977 | Sarbarcher et al. | 429/116 |
| 4,628,014 | 12/1986 | Hruden | 429/113 |

Primary Examiner—Brian E. Hearn
Assistant Examiner—Stephen J. Kalafut
Attorney, Agent, or Firm—Burns, Doane, Swecker & Mathis

[57] ABSTRACT

A deferred action battery in which activation is initiated by rotating one part of the battery (the rotor) with respect to a second part of the battery (the stator). A liquid electrolyte is stored within a chamber in the rotor, and a cathode mix is stored in a chamber in the stator. A rotor port leads to the rotor chamber and a stator port leads to the stator chamber. Prior to activation, the rotor and stator ports are misaligned and sealed, but rotation of the rotor with respect to the stator aligns the ports and permits the liquid electrolyte to flow from the rotor chamber through the rotor port, the stator port and into the stator chamber where it mixes with the cathode mix to activate the battery. In a second preferred embodiment, resilient spheres located between the rotor and the stator seal the rotor ports initially, but are rolled out of sealing engagement when the rotor is rotated to initiate activation of the battery.

20 Claims, 11 Drawing Figures

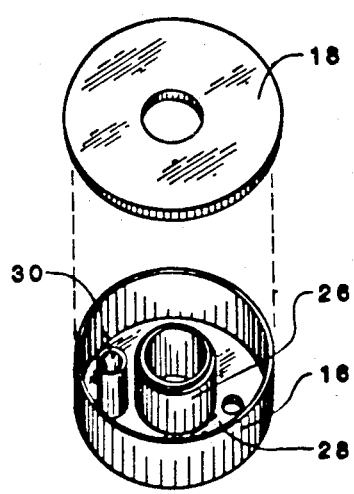
FIG. 6
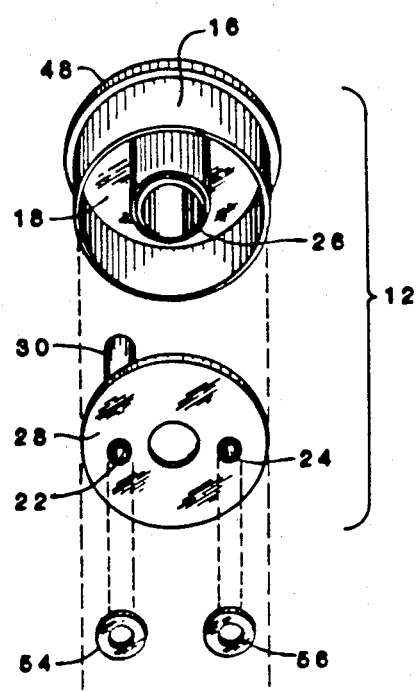
FIG. 1
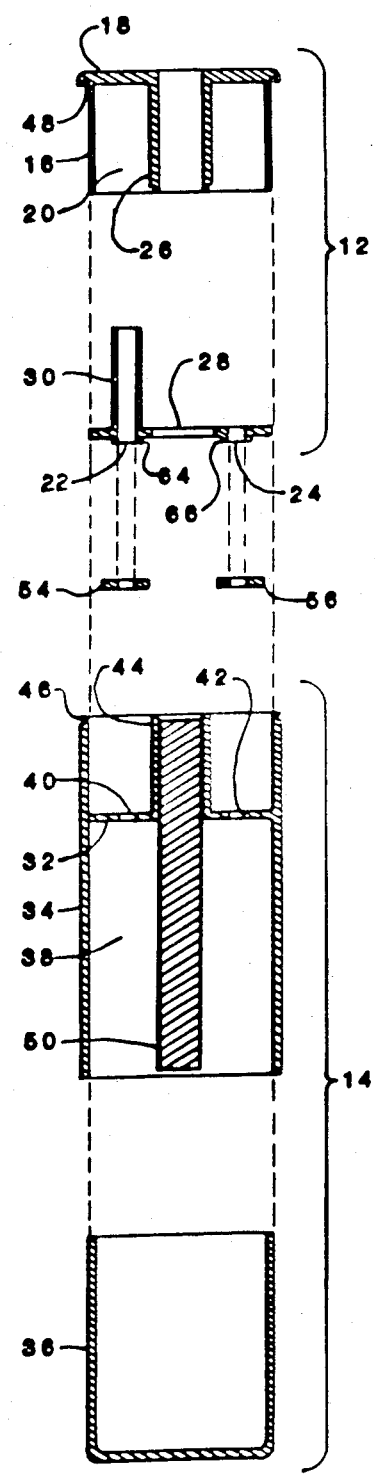
FIG. 2
FIG. 5
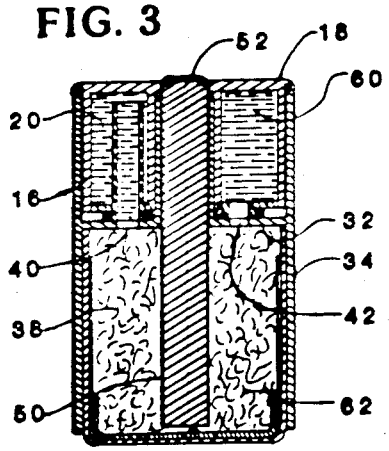
FIG. 3
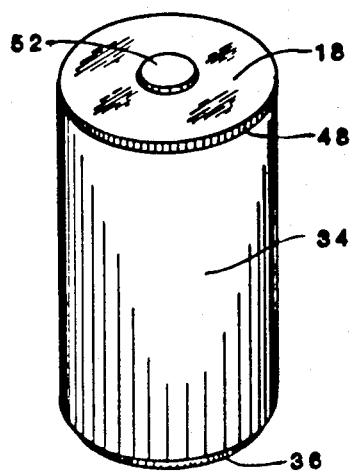
FIG. 4

FIG. 9
FIG. 10
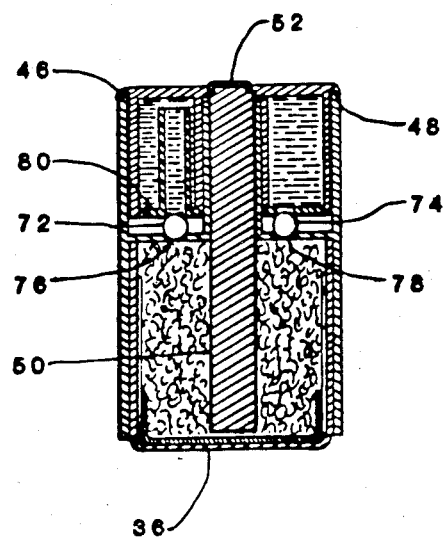
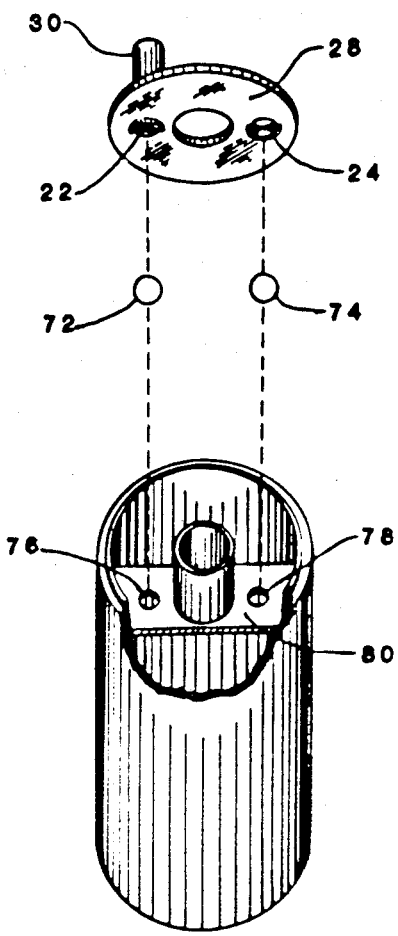
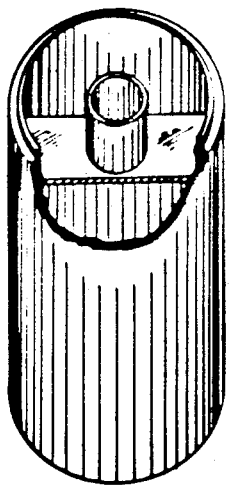
FIG. 11
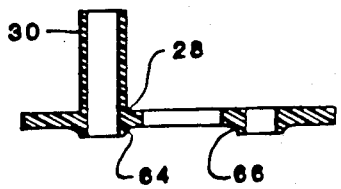
FIG. 7
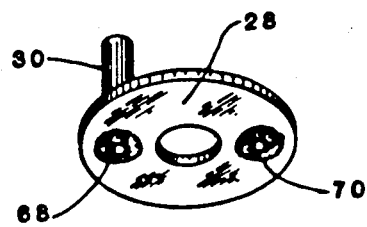
FIG. 8

DEFERRED ACTION BATTERY ACTIVATED BY ROTATION

This application is a continuation of application Ser. No. 601,865 filed Apr. 19, 1984.

BACKGROUND OF THE INVENTION

1. Field of the Invention

The present invention relates to the structure of a battery that permits the battery to be stored indefinitely and thereafter to be activated by rotating a first part of the battery with respect to a second part of the battery. The outside dimensions of the battery are the same before and after activation.

2. The Prior Art

A search of the prior art has found that a number of different structures have been employed for initiating activation of a deferred action battery. Some of these structures will be briefly discussed in the following paragraphs.

It will be seen that none of the known structures resembles the present invention, which is believed to be new in the art. This brief survey of the prior art will, however, serve to provide an understanding of the types of problems inherent in the structures of prior art batteries, and this understanding will then permit a better appreciation of the advantages of the structure used in present invention.

In U.S. Pat. No. 2,832,814 issued Apr. 29, 1958 to Shannon, there is disclosed a stem that extends from the battery under a protective cap and that allows the user to break a frangible weakened portion of the electrolyte reservoir to activate the battery.

In U.S. Pat. No. 3,228,801 issued Jan. 11, 1966 to Snyder, there is disclosed a deferred action battery in which an impervious barrier is located between the electrolyte paste and the zinc can. To activate the battery, the impervious barrier is drawn out of the battery thereby permitting contact of the previously separated elements.

In another type of deferred action battery, a liquid electrolyte is stored within the zinc cup, and the remaining elements of the battery are plunged into the liquid electrolyte to activate the battery. This type of structure is shown in U.S. Pat. No. Re. 15,846, issued May 27, 1924 to French and in U.S. Pat. No. 1,518,301 issued Dec. 9, 1924 to Benner, et al.

In the patent of French, the cartridge is provided with external threads that engage internal threads located at the open upper end of the zinc can. The user twists the cartridge relative to the zinc can, and the threads cause the cartridge to be screwed into the can. As the cartridge advances into the can, it strikes and breaks a wax seal that confines the liquid electrolyte, permitting the latter to contact the cartridge, thereby activating the battery.

This activation structure suffers from two major drawbacks. First, the wax seal may be broken accidentally; and second, the length of the battery after activation is shorter than its length before activation. As will be seen below, the structure of the present invention overcomes both of these disadvantages.

Probably the most widely used structure for activating a deferred action battery is the frangible member. Frangible members have been employed in U.S. Pat. No. 1,417,692 issued May 30, 1922 to Rosen; U.S. Pat. No. 1,503,380 issued July 29, 1924 to Rosen, et al.; U.S. Pat. No. 2,852,292 issued Sept. 16, 1958 to Salauze; U.S. Pat. No. 3,376,166 issued Apr. 2, 1968 to Hruden; and, U.S. Pat. No. 4,031,296 issued June 21, 1977 to Sarbacher, et al.

One problem common to batteries employing a frangible member is that the member is susceptible to being broken through inadvertence, as when the battery is accidentally dropped. A frangible member is by its very nature more readily broken than the remaining structure. In some designs the frangible member is also susceptible to damage at temperature extremes. As will be seen below, the battery of the present invention overcomes these problems of earlier designs.

SUMMARY OF THE INVENTION

The present invention employs a simple reliable design. Compared to batteries of the prior art, the battery of the present invention is relatively resistant to mechanical shock and is able to withstand temperature extremes.

The deferred action battery of the present invention remains the same size before and after activation, and this feature permits the battery to be stored in the equipment in which it is to be used at some later time. The deferred action battery of the present invention is activated by rotation of a first part (the rotor) with respect to a second part (the stator).

In accordance with the present invention, a liquid electrolyte is stored within a chamber in the rotor, while the relatively dry cathode mix is stored within a chamber in the stator. The rotor is constrained to rotate only, and not to translate with respect to the stator. The rotor includes a rotor port that extends into the rotor chamber. The rotor port is located off the axis of rotation of the rotor. The stator includes a stator port that opens into the stator chamber in which the cathode mix is stored. Rotation of the rotor with respect to the stator brings the rotor port adjacent the stator port, thereby permitting the liquid electrolyte stored in the rotor to drain through the stator port into the stator chamber where it penetrates into the cathode assembly to activate the battery.

In accordance with one aspect of the present invention, means are provided for sealing the rotor port prior to activation. In one embodiment, the sealing means includes a gasket that surrounds the rotor port and seals the rotor port against the stator. In another embodiment, a piece of resilient material is included between the rotor port and the stator to cover and seal the rotor port. In yet another embodiment of the present invention, rolling means are included between the rotor port and the stator, and the rolling means are rolled away from their sealing position against the rotor port upon rotation of the rotor with respect to the stator. In yet another embodiment, a ring of an adhesive material is deposited around the rotor port, and the adhesive material forms a seal between the rotor and the stator that also seals the rotor port. In yet another embodiment of the invention, a sharp lip surrounds the rotor port, and the stator is constructed of a softer material than the rotor, so that the sharp lip surrounding the rotor port seals against the stator.

In accordance with another aspect of the present invention, the rotor and stator are provided with multiple ports, and a vent tube extends from one of the rotor ports into the rotor chamber. The vent tube permits air, or other gases, that are displaced from the stator as the liquid electrolyte enters the stator to pass into the rotor chamber, thereby greatly expediting transfer of the liquid electrolyte. The present inventor found by experiment that the vent tube greatly reduces the time required for transfer of the liquid electrolyte and thereby greatly reduces the time required for activation of the battery.

In accordance with another aspect of the present invention, the rotor is secured to the stator by a snap ring that serves to maintain the parts in a desired position.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an exploded perspective view showing the structure of a deferred action battery in accordance with a first preferred embodiment of the present invention;

FIG. 2 is an exploded side cross-sectional view of the embodiment shown in FIG. 1;

FIG. 3 is a side cross-sectional view of the assembled battery of FIG. 1;

FIG. 4 is a perspective view of the assembled battery of FIG. 1;

FIG. 5 is a perspective view of a resilient disc used in an alternative embodiment of the battery of FIG. 1;

FIG. 6 is an exploded perspective view showing the structure of the rotor in an alternative embodiment of the battery of FIG. 1;

FIG. 7 is an enlarged cross-sectional view of a portion of the battery of FIG. 1;

FIG. 8 is a perspective view showing an alternative structure for a part of the battery of FIG. 1;

FIG. 9 is an exploded perspective view showing a second preferred embodiment of a deferred action battery in accordance with the present invention;

FIG. 10 is a side cross-sectional view showing the assembled battery of FIG. 9; and FIG. 11 is a perspective view partly cut away showing an alternative embodiment of the stator of the battery.

DETAILED DESCRIPTION OF THE PREFERRED EMBODIMENTS

Turning now to the drawings in whch like parts are designated by the same reference numerals throughout, it will be seen that FIGS. 1-8 relate to a first preferred embodiment of the invention and to certain variations of that embodiment, while FIGS. 9 and 10 relate to a second preferred embodiment of the invention.

Throughout the description, the invention will be referred to as a battery, in accordance with popular usage, rather than as a cell, which may be more accurate in a narrow technical sense.

In both preferred embodiments, a structure appropriate to a size D battery is shown, but it can readily be appreciated that by altering the dimensions of the parts, the invention can be adapted to batteries of other sizes.

Although the chemistry of the battery is not the subject of the present invention, it should be mentioned that the embodiments shown are intended for use in a Leclanche cell, and for that reason when mention is made below of a zinc can or a carbon rod, it will be understood that these chemicals are used by way of example only, and are not intended to limit the field of use of the battery structure disclosed. The present invention is directed to the structure of the inert portions of the battery which together provide a mechanical expression of the activation concept. In the present invention, so long as the structural parts are inert to the chemicals used, any of a wide variety of materials may be employed. In the best mode presently known of practicing the invention, and by way of example, the parts are molded of a plastic material known as polypropylene because of its adaptability to injection molding and because of its resistance to mechanical shock.

As seen in the exploded perspective view of FIG. 1, the battery structure, in a first preferred embodiment, includes a rotor 12 and stator 14. The rotor 12 is formed of two parts. The first part includes the cylindrical side wall 16 of the rotor, the top end 18 of the rotor and a tube 26. In the preferred embodiment shown in FIGS. 1 and 2, these elements are part of a unitary structure.

The second part of the rotor 12 includes the bottom plate 28 and the vent tube 30. This second part fits on the first part to form the rotor.

When thus assembled, as shown in FIG. 3, the rotor includes a rotor chamber 20 for containing a liquid electrolyte 60 and also, the bottom plate 28 includes the rotor ports 22, 24.

The stator 14 includes a cylindrical side wall 34, an upper plate 32 and a tube 44. These parts form a unitary structure as seen in FIG. 2.

The bottom end of the stator 14 is closed by a zinc cup 36 that fits into the cylindrical side wall 34. When assembled as shown in FIG. 3, the stator includes a stator chamber 38 for containing the cathode mix 62. Stator ports 40, 42 are provided in the upper plate 32 to permit transfer of the liquid electrolyte 60 into the cathode mix 62.

FIG. 6 shows an alternative structure for the rotor in which the top end 18 is initially separate from the remaining parts, and in which the remaining parts form a unitary structure. The top end 18 is then bonded or welded to the cylindrical side wall 16 and to the tube 26 to form the completed rotor.

The rotor 12 is secured to the stator by the snap ring 48 which engages the lip 46 of the stator. The snap ring 48 is knurled about its circumference to permit the user to obtain a better grip on it. The length of the rotor 12 is such that when the rotor is secured to the stator 14, the rotor ports 22, 24 will lie flush against the top surface of the upper plate 32 of the stator.

Although it would probably be sufficient merely to rely on the juxtaposition of the bottom plate 28 of the rotor against the upper plate 32 of the stator to prevent leakage of the liquid electrolyte 60, various alternative embodiments provide greater protection against leakage.

In the preferred embodiment shown in FIGS. 1 and 2, the rotor ports 22, 24 are provided with the lips 64, 66 respectively that extend below the plane of the bottom plate 28 to engage the gaskets 54, 56. Those gaskets are formed of a resilient material that seals against both the bottom plate 28 of the rotor and the upper plate 32 of the stator.

In another alternative embodiment shown in FIG. 7, the lips 64, 66 are tapered to a relatively sharp edge. In one variation, the rotor is formed of a substance that is harder than the material of which the upper plate 32 of the stator is composed. The rotor is of such a length that when the snap ring 48 is engaged with the lip 46 of the stator, the lips 64, 66 bear against the upper plate 32 of the stator with sufficient pressure to deform the upper plate 32 of the stator so as to form a better seal. This variation can also be used advantageously with a stator of the type shown in the alternative embodiment of FIG. 11, which resembles the stator of FIG. 9 except for the holes 76, 78.

In another alternative embodiment, the length of the rotor is slightly shortened to permit the lips 64, 66 to bear against disks of resilient material of which the disk 58 of FIG. 5 is typical. The pressure of the lips against the resilient disks effectively seals the rotor chamber. In this embodiment, the disk 58 is bonded to the upper plate 32 of the stator.

In yet another alternative embodiment, shown in FIG. 8, the rotor ports 22, 24 are surrounded by rings 68, 70 of an adhesive material. Upon assembly of the rotor with the stator, the adhesive material adheres to the upper plate 32 of the stator forming a seal comparable to the seal made by the gaskets 54, 56 in the embodiment of FIG. 1, as described above.

FIG. 9 is an exploded view showing a second preferred embodiment of the deferred action battery of the present invention. FIG. 10 shows the second preferred embodiment in a cross-sectional view after it has been assembled. In this embodiment, large sections of the upper plate 32 of the stator have been omitted, and the remaining portion of the upper plate constitutes merely a bridge 80 that extends diametrically across the cylinder. In accordance with this embodiment, the bridge 80 includes the holes 76, 78 which serve merely to seat the spheres 72, 74 respectively. The spheres 72, 74 serve to seal the rotor ports 22, 24.

In an alternative embodiment, the holes 76, 78 are replaced by depressions in the surface of the bridge 80.

In this second preferred embodiment of the invention, shown in FIGS. 9 and 10, the length of the rotor is such that when the snap ring 48 is engaged to the lip 46, the bottom plate 28 of the rotor will be preloaded against the spheres 72, 74, which in turn will be forced against the rims of the holes 76, 78. This preloading force results in a better seal. In the preferred embodiment, the spheres 72, 74 are composed of a resilient material. FIG. 10 shows the second preferred embodiment prior to activation. In this embodiment, the open spaces on either side of the bridge 80 are the stator ports.

In the first preferred embodiment and its variations, shown in FIGS. 1–8, prior to activation, the rotor has been initially positioned at such a position that the rotor ports 22, 24 do not overlap the stator ports 40, 42. Activation is achieved by rotating the rotor to a position where the rotor ports 22, 24 do overlap the stator ports 40, 42, thereby permitting the liquid electrolyte 60 that was stored in the rotor chamber 20 to flow through the rotor port 24 and the stator port 42 into the stator chamber 38, where the electrolyte permeates the cathode mix 62. As the liquid electrolyte 60 flows into the stator chamber 38, it displaces whatever gas is present in the stator chamber and that gas flows through the stator port 40 and through the vent tube 30 into the rotor chamber 20. It was discovered that the provision of the vent tube 30 greatly facilitates the flow of electrolyte, thereby expediting the activation process.

In one variation of the first preferred embodiment of FIGS. 1–8, the stator ports 40, 42 are large enough to accommodate the lips 64, 66 so that the rotor snaps into the activated position.

In the second preferred embodiment shown in FIGS. 9 and 10, in its pre-activation condition, the rotor ports 32, 34 are sealed by the spheres 72, 74 which are seated in the holes 76, 78, as described above. Activation is initiated by rotating the rotor with respect to the stator. This rotation causes the spheres 72, 74 to roll between the bottom plate 28 of the rotor and the bridge 80. After a small amount of rotation, the spheres 72, 74 fall off the bridge 80 into the stator chamber 38, thereby unsealing the rotor ports 22, 24. This permits the liquid electrolyte 60 to drain through the rotor port 24 into the stator chamber 38, and the displaced gas to flow through the vent tube 30 into the rotor chamber 20.

Thus, there have been described two preferred embodiments of a deferred action battery in which activation is initiated by rotating a first part of the battery with respect to a secodn part of the battery, and in which the outside dimensions, such as the length and diameter, are the same after activation as they were before activation. In a first preferred embodiment of the invention, ports in the rotor are rotated into communication with ports in the stator, while in the second preferred embodiment the rotor ports are sealed by rotatable members that roll out of sealing engagement with the rotor ports when the rotor is rotated with respect to the stator to initiate activation.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A deferred action battery comprising:
   a rotor having a longitudinal axis therethrough and having an outer circumference that is capable of being gripped by hand, said rotor having a rotor hcamber therein for containment of liquid electrolyte, said rotor chamber having at least one rotor port communicating with said rotor chamber, said rotor port having a flow axis therethrough generally parallel to said longitudinal axis and being radially offset from said longitudinal axis; and
   a stator adjacent said rotor and being rotatably mounted with respect to said rotor about said longitudinal axis, said stator having an outer side wall that is also capable of being gripped by hand to rotate said rotor with respect to said stator, said stator having a stator chamber therein for containment of cathode mix, said stator chamber having at least one stator port communicating with said stator chamber, said stator port having a flow axis therethrough generally parallel to said longitudinal axis and being radially offset from said longitudinal axis, said rotor port and said stator port capable of general registration alignment upon rotation of said rotor with respect to said stator permitting liquid electrolyte to be contained in said rotor chamber to flow through said ports into said stator chamber to permeate cathode mix to be contained within said stator chamber to activate the battery, said battery having the same outside dimensions before and after rotation of said rotor with respect to said stator to activate said battery.

2. A deferred battery as in claim 1 wherein said rotor chamber contains at least on additional rotor port extending axially into said rotor chamber and being radially offset from said longitudinal axis defining a vent tube and wherein said stator chamber contains an additional stator port extending into said rotor chamber and being radially offset from said longitudinal axis, said additional ports capable of general registration alignment when said rotor and stator ports are in registration to facilitate the outflow of electrolyte to be contained within said rotor chamber.

3. A deferred action battery as in claim 1 further including sealing means between said rotor port and said stator port and sealing said rotor port, rotation of said rotor with respect to said stator capable of disrupting the sealing of the rotor port.

4. A deferred action battery as in claim 3 wherein said sealing means comprises at least one gasket of resilient material.

5. A deferred action battery as in claim 3 wherein said sealing means comprises at least one disc of resilient material.

6. A deferred action battery as in claim 3 wherein said sealing means comprises at least one ring of adhesive material surrounding said rotor port.

7. A deferred action battery as in claim 3 wherein said sealing means comprises at least one member shaped to roll between said rotor and said stator when said rotor is rotated with respect to said stator to activate the battery.

8. A deferred action battery as in claim 7 wherein said member shaped to roll is lodged between said rotor port and said stator port prior to rotation of said rotor with respect to said stator, said member capable of sealing the rotor port.

9. A deferred action battery as in claim 1 wherein said rotor further includes at least one lip surrounding said rotor port.

10. A deferred action battery as in claim 9 wherein said stator is composed of material that is softer than the material of which the rotor is composed, said lip deforming said softer material to effectively seal said rotor chamber.

11. A deferred action battery comprising:
a rotor having a longitudinal axis therethrough and having outer circumference that is capable of being gripped by hand, said rotor having a rotor chamber therein, said rotor chamber having at least one rotor port communicating with said rotor chamber, said rotor port having a flow axis therethrough generally parallel to said longitudinal axis and being radially offset from said longitudinal axis;
liquid electrolyte contained within said rotor chamber;
a stator adjacent said rotor and being rotatably mounted with respect to said rotor about said longitudinal axis, said stator having an outer side wall that is also capable of being gripped by hand to rotate said rotor with respect to said stator, said stator having a stator chamber therein, said stator chamber having at least one stator port communicating with said stator chamber, said stator port having a flow axis therethrough generally parallel to said longitudinal axis and being radially offset from said longitudinal axis, said rotor port and said stator port capable of general registration alignment upon rotation of said rotor with respect to said stator, said battery having the same outside dimensions before and after rotation of said rotor with respect to said stator; and
cathode mix contained within said stator chamber, said liquid electrolyte capable of flowing through said ports when said ports are in registration alignment from said rotor chamber into said stator chamber to permeate said cathode mix to activate the battery.

12. A deferred battery as in claim 11 wherein said rotor chamber contains at least one additional rotor port extending axially into said rotor chamber and being radially offset from said longitudinal axis defining a vent tube and wherein said stator chamber contains an additional stator port extending into said rotor chamber and being radially offset from said longitudinal axis, said additional ports capable of general registration alignment when said rotor and stator ports are in registration to facilitate the outflow of electrolyte to be contained within said rotor chamber.

13. A deferred action battery as in claim 11 further including sealing means between said rotor port and said stator port and sealing said rotor port, rotation of said rotor with respect to said stator capable of disrupting the sealing of the rotor port.

14. A deferred action battery as in claim 13 wherein said sealing means comprises at least one gasket of resilient material.

15. A deferred action battery as in claim 13 wherein said sealing means comprises at least one disc of resilient material.

16. A deferred action battery as in claim 13 wherein said sealing means comprises at least one ring of adhesive material surrounding said rotor port.

17. A deferred action battery as in claim 13 wherein said sealing means comprises at least one member shaped to roll between said rotor and said stator when said rotor is rotated with respect to said stator to activate the battery.

18. A deferred action battery as in claim 17 wherein said member shaped to roll is lodged between said rotor port and said stator port prior to rotation of said rotor with respect to said stator, said member capable of sealing the rotor port.

19. A deferred action battery as in claim 11 wherein said rotor further includes at least one lip surrounding said rotor port.

20. A deferred action battery as in claim 19 wherein said stator is composed of material that is softer than the material of which the rotor is composed, said lip deforming said softer material to effectively seal said rotor chamber.

* * * * *

UNITED STATES PATENT AND TRADEMARK OFFICE
CERTIFICATE OF CORRECTION

PATENT NO. : 4,725,514
DATED : February 16, 1988
INVENTOR(S) : Wayne R. Hruden

It is certified that error appears in the above—identified patent and that said Letters Patent is hereby corrected as shown below:

Column 2, line 1, "2,852,292" should be --2,852,592--.

Column 3, line 55, "whch" should be --which--.

Column 4, line 5, "zine" should be --zinc--.

Column 6, line 1, "faciliates" should be --facilitates--.

Column 6, line 23, "secodn" should be --second--.

Column 6, line 45, "hcamber" should be --chamber--.

Column 7, line 5, "on" should be --one--.

Signed and Sealed this

Thirteenth Day of September, 1988

Attest:

DONALD J. QUIGG

Attesting Officer      Commissioner of Patents and Trademarks